United States Patent [19]
Rossiter

[11] Patent Number: 5,375,307
[45] Date of Patent: Dec. 27, 1994

[54] CUT-OFF MEANS

[75] Inventor: Anthony L. Rossiter, Greenfields, Australia

[73] Assignee: Vergola International Pty, Ltd., Australia

[21] Appl. No.: 36,910

[22] Filed: Mar. 25, 1993

[51] Int. Cl.$^5$ .................. B23D 21/00; B23K 21/00
[52] U.S. Cl. .................. 29/33 K; 29/564.6; 83/597
[58] Field of Search ........ 29/24.5, 23K, 56.6, 29/33 T, 564.6, 564.8; 83/54, 597, 694; 30/92

[56] References Cited

U.S. PATENT DOCUMENTS

| 3,119,296 | 1/1964 | Foster | 83/54 X |
| 3,279,295 | 10/1966 | Teplitz | 83/694 X |
| 3,516,312 | 6/1970 | Nordberg et al. | 83/59 X |
| 3,924,502 | 12/1975 | Borzym | 83/454 |
| 4,412,380 | 11/1983 | Kish | 30/92 |

FOREIGN PATENT DOCUMENTS 576968 9/1988 Australia .
3564 11/1990 Australia .
1287015 1/1962 France ............................ 30/92
112329 8/1900 Germany ........................ 83/597
375177 6/1973 U.S.S.R. ........................ 83/54

Primary Examiner—Z. R. Bilinsky
Attorney, Agent, or Firm—Brown, Martin, Haller & McClain

[57] ABSTRACT

A cut-off (10) for severing an elongate hollow form member comprises a die (11) having a pair of spaced blades (22), the hollow form member being supported on the upper surface of the die (11), the upper surface of each blade (22) being shaped so that they are contiguous with the lower surface of the hollow form member, a punch (12) having a pointed substantially triangular shaped blade (28), punch (12) above the die (11), controlling the punch (12) such that it moves towards the die (11), and controlling the descent of the punch (12) such that the punch (12) impacts the upper surface of the hollow form member with sufficient force to pierce and cut the upper surface of the hollow form member. A cap fitting apparatus is provided for fitting end caps to each end of the severed hollow form member.

9 Claims, 4 Drawing Sheets

CUT-OFF MEANS

This invention relates to an improved cut-off means, and in particular to a means that simplifies the cutting or severing to length of hollow form members, and the placement of fittings to each end of a length of severed hollow form member.

Hollow form members may comprise, for example, extruded or roll formed members. In the case of roll forming, one or more sheet metal strips may be continuously roll formed into a hollow form member. A great many cross-sectional shapes can be produced using such processes.

In Australian Patent No. 60674/86, there is described a louvre blade forming machine Which forms elongate louvres from continuous strips of sheet metal. This machine is capable of producing louvres of various lengths which are formed so as to have hollow cross-sections.

Although the present invention will find application in severing hollow form members a great variety of cross-sectional shapes, the present invention will be described in respect of the louvre disclosed in Australian Patent No. 60674/86. However, it should be realised that the invention will in no way be limited to this particular application.

In that Australian Specification No. 60674/86, after the forming of the louvre, a cut-off means such as an abrasive wheel was used to cut the formed louvre to the desired length. The Applicant has found that this cut-off procedure is labour intensive and time consuming. In addition, grinding sparks may embed in the louvre coating and later rust, resulting in an unsightly appearance.

Therefore, it is an object of this invention to provide an improved means of severing hollow form members to a desired length.

The louvres formed by the abovementioned machine are also described in Australian Patent No. 33573/84. This specification shows the louvres having end caps fitted which enable each louvre to rotate about its longitudinal axis, and which enable a plurality of louvres in a spaced arrangement to rotate so as to form a continuous closed surface, or to rotate to an open position.

In this embodiment, each of the end caps were moulded in a plastic material, and were secured to the end of each louvre by a fastening process such as a blind rivet or a threaded fastener.

Again, it was found that the fitting of plastic end caps was labour intensive as it was necessary to first fit the end cap, drill the necessary holes through the end cap flange and the top of the louvre, and then to fit the required fastener. Other disadvantages existed such as the formation of swarf within the louvre, and the formation of a corrosion site.

In order to overcome this problem, an improved end cap was developed, which is described in patent application Ser. No. 88092/91. In this specification, an end cap is described which has a spring clip style fitting which allows the end cap to be pushed onto the end of the louvre but which then locks and holds the end cap in place on the end of the louvre. The spring clip is designed to grip onto the end of the louvre when a withdrawal force is applied.

This greatly improves the speed with which end caps can be fitted to the ends of the formed louvres, and it is a further object of this invention to produce an end cap fitting means which simplifies the fitting of end caps to each end of a hollow form member.

In its broadest form, the invention is a cut-off means for severing an elongate hollow form member comprising a die having a pair of spaced blades, said hollow form member being supported on the upper surface of said die, the upper surface of each said blade shaped so that they are contiguous with the lower surface of said hollow form member, a punch comprising a pointed substantially triangular shaped blade, said punch being locatable between the pair of spaced blades of said die, and movement control means for holding said punch above said die, controlling said punch such that it moves toward said die and controlling the descent of said punch such that the punch impacts the upper surface of said hollow form member with sufficient force to pierce and cut the upper surface of said hollow form member, and to continue through said die thereby severing said hollow form member.

Preferably, the point of the triangular punch impacts substantially the mid point of the upper surface of the hollow form member. The point impact combined with sufficient velocity and force causes the punch to pierce the upper surface of the hollow form member without causing any permanent deformation of the upper surface. The triangular arrangement of the punch causes a cut to progressively move from the mid point of the hollow form member across the member in either direction, and as the punch progresses through the member, the punch in turn impacts against the lower member surface, and in combination with the pair of blades forming the first die, continues to cut through the lower surface of the hollow form member. As with the upper surface, the point of the punch first pierces the lower surface, and as the punch continues through the lower surface between the spaced blades of the die, a cut extends across the member from the centre point in both directions. Eventually, the hollow form member is fully cut once the punch has passed fully through the member and the die.

Preferably, a support may be positioned between the upper and lower surfaces of the louvre immediately adjacent the point of impact. In the normal construction technique used to form a louvre, a centre stiffening tube is placed between the sheets as they are roll formed together. Depending on strength requirements, either a polymeric material tube, or a metal tube are positioned between the upper and lower surfaces of the louvre along the longitudinal axis of each louvre. Both such tubes either plastics or metal are in contact with the upper and lower surfaces, and therefore at the instant of impact of the punch, additional stiffness in the metal surface results which in turn assists the punch piercing the upper surface.

However, the Applicant has found that the upper surface of the louvre does have sufficient inherent stiffness to normally withstand the impact so as to cause piercing without deformation.

Preferably, the centre tubes, when metal tubes are used, do not extend through the portion of the louvre that lies across the die. Discrete lengths of tubes are placed within the louvres so that a space can be arranged between the tubes which corresponds with the position of the die such that the punch does not also pierce the tubing. The ends of the tube adjacent the die are positioned as close as practical to the point of impact of the punch so as to provide maximum support.

Preferably, a movement means is provided which comprises either a free falling punch, or a forced impact using the assistance of pneumatic cylinders or other similar devices. The movement means may also comprise a pivoted arm having the punch at one end of the arm. In such an arrangement, the arm may swing from a substantially vertical position to a substantially horizontal position where the punch engages the hollow form member and die.

Both the punch and the die may also be provided with support means which are specifically designed to prevent deformation of the edge regions of the louvre during the cutting process. As will be seen from previous patent applications, the longitudinal edges of the louvre has on one side an upwardly turned edge, and on the other side a downwardly turned edge. Therefore, the die may be provided with a portion which is upwardly directed and is contiguous with the upwardly directed edge as the punch engages the louvre, this upwardly directed edge of the louvre is forced against this support means on the die, and therefore prevents any deformation of this edge.

Further, the die may have downwardly directed surfaces which support the downwardly directed edge on the opposite side. In addition, the punch may he provided with support means or further cutting means which impacts against the downwardly directed edge and commences a cut that progresses inwardly and meets the advancing cut formed by the other portion of the punch. This also prevents deformation of the downwardly directed edge due to bulging forces created by trapped off-cut which accumulated towards the edge as the cut of the punch progresses across the louvre.

In a further aspect of this invention there is provided means for fitting end caps to a louvre comprising a substantially horizontal bed over which the louvre extends as it is being roll formed, a first stop pivotally attached to the bed and positioned such that the louvre would abut against it as the louvre extends across the bed, a latch means on the first stop which releases the first stop and allows it to rotate clear of the louvre once a predetermined force is applied to the first-stop, said latch also having means for returning the first stop to an upright position once the louvre has passed, a second stop spaced from the first stop and an actuator for moving the second stop in relation to the bed.

Preferably, the first stop is positioned adjacent to the above described cut-off means. Prior to actuation of the cut-off means, the louvre is formed so that it extends and passes across the die. In order to locate the first end cap, the end cap may be positioned against the first stop and aligned such that the roll forming of the louvre forces the first end of the louvre into the end cap.

Once the louvre has engaged the end cap, the louvre applies force to the first stop, and at a predetermined force level, the latch mechanism disengages and allows the first stop to rotate away from the forward end of the louvre, thereby allowing the louvre to pass. Preferably, rollers are provided along the upper edge of the first stop so as to prevent scoring or damage to the underside surface of the louvre.

The second stop which is spaced a distance away if from the first stop is positioned on the bed in relation to the desired length of the louvre being formed. Preferably, the second stop is provided with a gripping mechanism which may comprise a pair of pivotally mounted fingers through which a spigot on the end cap may pass. Once the spigot passes between the fingers, it cannot be withdrawn.

Preferably, the second stop is provided with a sensor which ceases the roll forming operation once the louvre abuts against the second stop and engages the gripping mechanism. At this point, the desired length of louvre has been roll formed, and the cut-off operation may commence. Once the louvre has been severed, the actuator moves the second stop along the bed away from the first stop thereby causing the other end of the louvre to pass over the first stop. Once the louvre passes over the first stop it is returned to its upright position. Preferably, a spring means is provided which will raise the first stop.

The second end cap is then placed between the louvre and the first stop. The end cap is aligned such that the actuator may push the louvre into the end cap, and provides sufficient force to properly engage both end caps to the louvre. Once this operation is complete, then the finished louvre may be removed from the bed.

The second stop may also be provided with arms which are pivotally attached to the second stop, and swing from a substantially vertical position to a horizontal position and engage the top surface of the louvre. The arms are arranged to secure the end of the louvre with respect to the second stop and prevent any warping of the louvre from disengaging the end cap from the gripping mechanism.

In addition, prior to the cut-off means operating, the clamp members which are positioned on the bed adjacent to the die may be activated to engage both the upper and lower surfaces of the louvre to provide support during the cut-off operation. The clamp mechanisms may be provided with rollers to prevent scoring or damage to the upper or lower surface of the louvre.

In order for the invention to be fully understood, a preferred embodiment will now be described. This embodiment will be described in relation to the production of louvres. However, it should be realised that the invention is not to be restricted to this particular application as described above, and is not to be restricted to the precise details described in this embodiment. This embodiment is illustrated in the accompanying representations in which.

Figure 1:
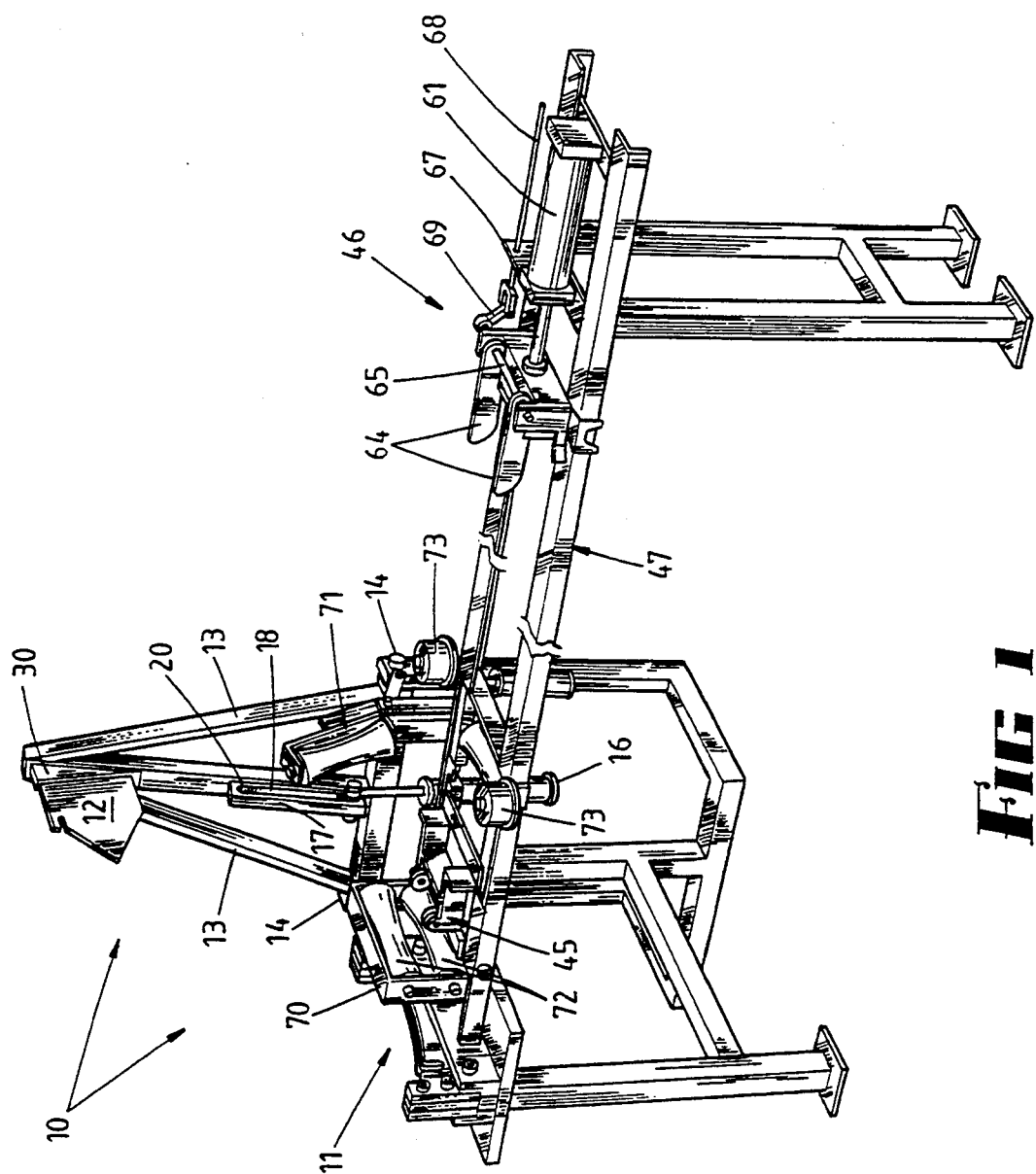
FIG. 1 shows a perspective view of the cut-off and end caps fitting means.

In this embodiment, as is shown in FIG. 1, the cut-off means 10 comprises a die 11 and a punch 12. The punch 12 is attached to a movement control means comprising an arm 13 that is pivotally attached to a support via pivot 14. In this embodiment, the arm 13 comprises a triangular frame having a pair of pivots 14. The punch 12 is located at the apex of the triangular arrangement.

In order to control the operation of the arm 13, a ram 16 is provided which engages a bracket 17. As shown in FIG. 1, the bracket 17 is provided with an elongate slot, and as shown the end of the ram 16 is at the lower portion of the slot 18. Further, in this position the arm 13 rests against a stop (not drawn) at an angle away from the vertical. Actuation of the ram 16 pulls the bracket 17 downwardly which in turn applies a turning moment to the pivot 14 and initiates swinging of the arm 13 towards the die 11.

Figure 5:
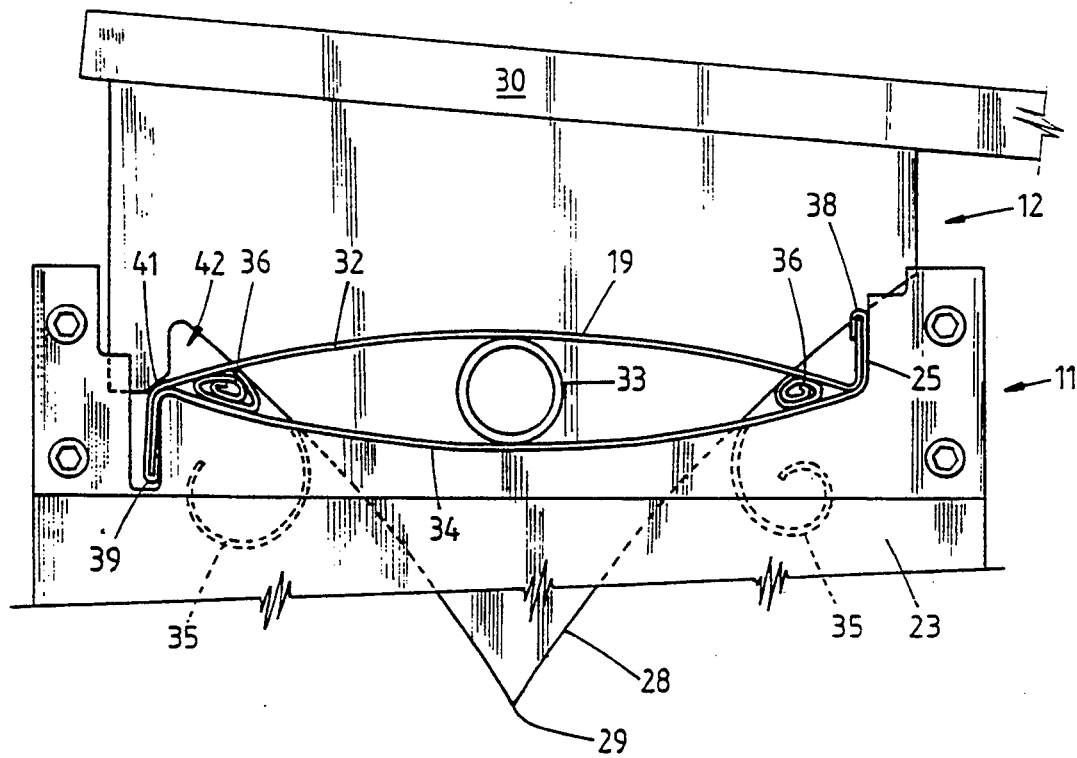
FIG. 5 shows schematically the operation of the punch in relation to the die in the cutting of a louvre.

The die 11 supports the louvre 19 which is shown in cross-section in FIG. 5. Once the ram 16 rotates the arm 13 past the vertical position, and the arm 13 falls under its own weight towards the die, and performs the severing operation which will he described below. During the rotation of the arm 13, the end of the ram 16 moves along the slot 18 to the end 20. Once the arm 13 is in a horizontal position, by actuating the ram 16, the arm 13 can be raised vertically through to its rest position against the stop.

Prior to further operation of the cut-off means 10, the ram 16 remains at the end 20 thereby preventing the arm 13 from accidentally falling.

In order to ensure that the punch 12 impacts the louvre 19 with the required force and speed weight may be added to the arm 13 thereby increasing the arm's inertia and momentum, and therefore force and speed, at the point of impact.

Figure 2:
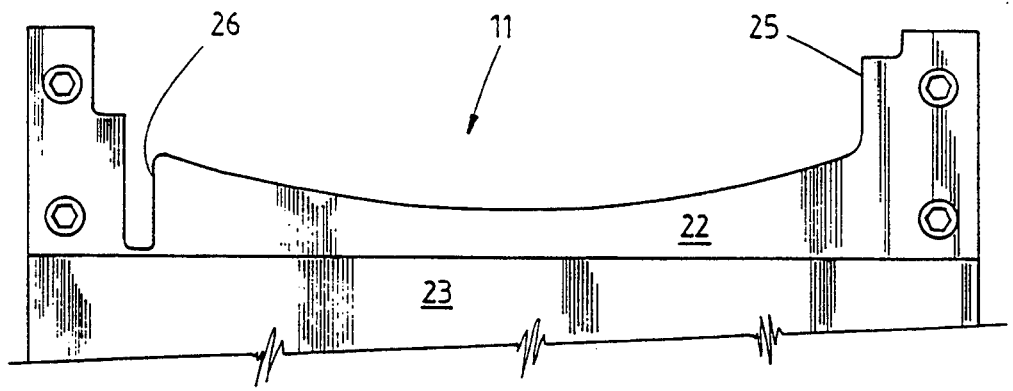
FIGS. 2 and 3 show a side and plan view respectively of the die.
Figure 3:
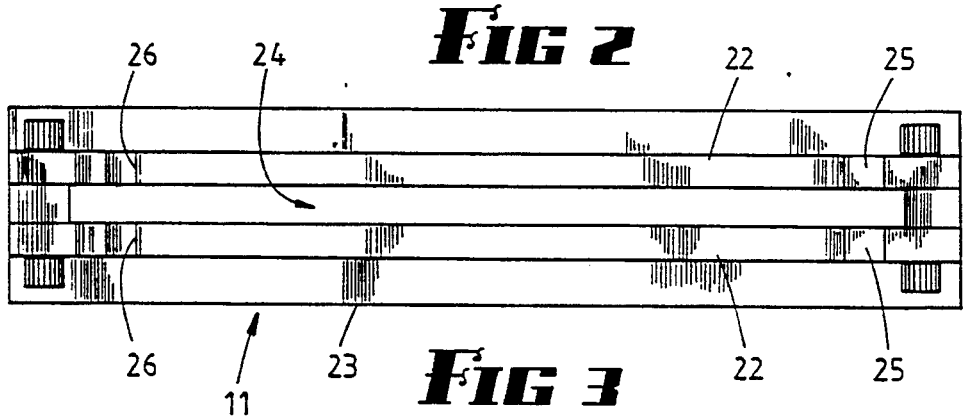

As seen in FIGS. 2 and 3, the die comprises a pair of spaced blades 22 that are secured to a base plate 23. The base plate 23 is provided with a slot 24 which is located between the blades 22.

The upper surface of each of the blades 22 is shaped so that when the underneath surface of the louvre 19 locates on the blades 22, the surface of the louvre 19 is contiguous with the upper surfaces of the blades 22. During the roll forming process the louvre 19 is clear of the upper surface of each blade 22 so that the louvre surface is not scored. The action of the punch 12 forces the louvre 19 into contact with the blades 22.

Further, support means for the louvre edges are provided on the die 11. As will be seen from the previous patent applications, the roll formed louvre has an upwardly directed edge and a downwardly directed edge. In respect of the die 11, the upwardly directed edge is supported by surface 25, and the downwardly directed edge is supported by surface 26.

Figure 4:
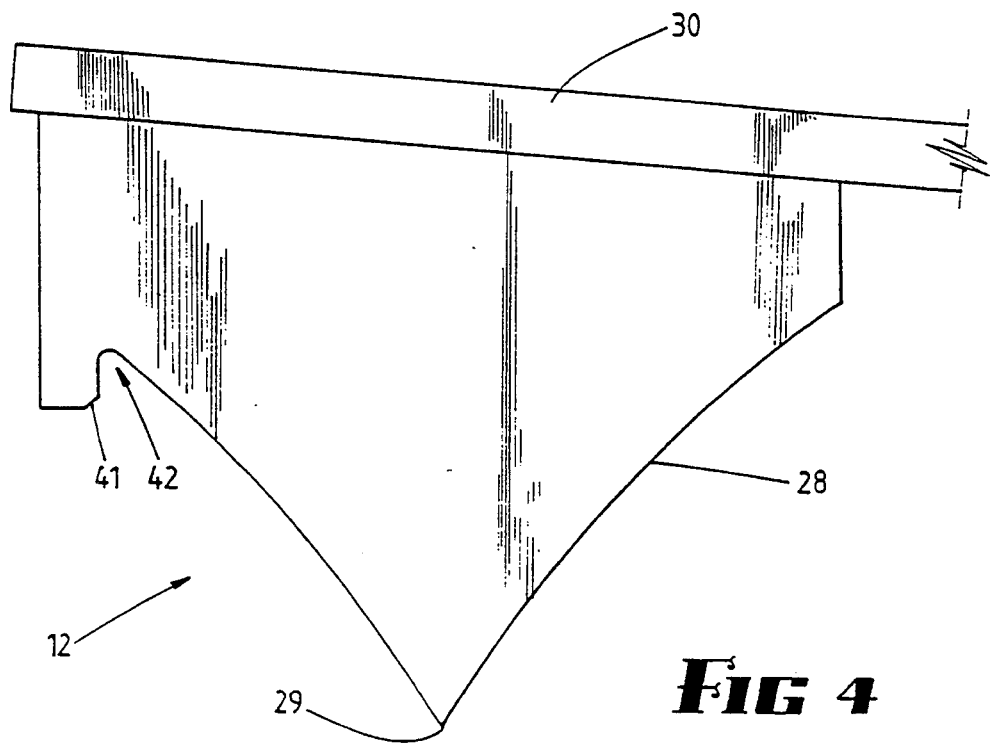
FIG. 4 shows a side view of the punch.

As shown in FIG. 4, the punch 12 comprises a punch blade 28 which is substantially triangular in form and having a piercing point 29. The punch blade 28 is attached to a base plate 30 which is in turn secured to the arm 13.

Both the punch blade 28 and the blades 22 of the die are formed from hardened steel, and are generally of a thickness sufficient to withstand the forces being applied. In this embodiment, the blades are between 8 and 10 mm thick, and are formed in heat treatable steel which is hardened and then ground, and finally honed to produce sharp edges to the blades 22 and the punch blade 28. The punch blade 28 locates within the slot 24 of the die 11, and clearance is provided in accordance with normal punch and die requirements.

FIG. 5 shows in schematic detail the cutting operation of the louvre 19. Upon release of the arm 13, the punch blade 28 is directed at the upper surface 32 of the louvre 19. The piercing point 29 impacts the upper surface 32 at the mid point of the louvre blade 19, and due to the speed of impact, the point loading at the piercing point 29 is extremely high, which results in the punch blade 28 piercing the upper surface 32. The centre tube 33 if plastic, will also be cut, but if steel tube is used then discrete lengths of tube will be used and there will be a gap between the steel tubes at the cutting zone. The tube 33, either steel or plastic, further supports the upper surface 32 which results in piercing of the upper surface 32 without deformation.

During the initial stages of the cutting operation, the punch blade 28 is travelling only through the upper surface 32 of the louvre 19. During this initial cutting process, thin strips of metal or slugs will be cut away either side of the piercing point 29.

As the punch blade 28 progresses through the louvre 19, the piercing blade impacts and pierces the lower surface 34. Again as the punch blade 28 progresses through the Lower surface 34, strips of metal 35 are removed from the louvre on either side of the punch blade 28. The cutting-of the lower surface 34 differs from the cutting of the upper surface 32 in that the cutting is the combination of both the punch blade 28 and the blades 22 whereas the cutting of the upper surface 32 relies upon shear forces generated by the edge of the punch blade 28 by itself.

As is illustrated in FIG. 5, the strips 35 tend to curl as they are being cut away from the louvre 19. Obviously, the strips 35 which are being removed from the lower surface 34 project into the slot 24 and therefore always remain clear of the punch blade 28. However, due to the triangular nature of the punch blade 28, the cutting of the upper surface 32 is always ahead of the cutting of the lower surface 34. Due to the curling of the strips, the strips formed from cutting of the upper surface 32 have a tendency to locate between the upper and lower surfaces 32 and 34 of the louvre 19, rather than always being cleared through the slot 24. Therefore, when the cutting of the louvre 19 reaches the stage illustrated in FIG. 5, in many instances, the strip cut from the upper surface 32 is compressed into the edge portions 36 between the upper and lower surfaces 32 and 34 at each edge of the louvre 19. Obviously, this build up of material into a small volume creates significant pressures as the cutting process continues, and due to the different orientation in relation to the upwardly directed edge 38 and the downwardly directed edge 39, different cutting forces result on either aide of the louvre 19.

In respect of the upwardly directed edge 38, at the stage that the punch blade 28 contacts the uppermost point of the upwardly directed edge 38, the build up of pressure is not significant. As She cutting progresses and the pressure builds up, the punch blade 28 forces the upwardly directed edge against the support surface 25. This prevents any upward buckling of material, and ensures that the upper and lower strips of material cut away are forced through the slot 24.

As mentioned, the situation is entirely different in relation to the downwardly directed edge 39, as the die 11 has no walls which are capable of supporting the outward bursting pressure which will cause the seam formed at the downwardly directed edge 39 to spread and buckle. In order to overcome this problem, the punch blade 28 is provided with a secondary cutting edge 41, and a recess 42. The secondary cutting edge 41 is designed to contact the louvre 19 at a stage when the pressure within the edge portion 36 is rising to the point where buckling will occur. As seen in FIG. 5, this contact by the secondary cutting edge 41 occurs before the cut on the upper surface 32 reaches the downwardly directed edge 39.

At this stage, contact by the secondary cutting edge 41 restrains any pressure build up, and in fact causes forces which are directed back towards the advancing out on the upper surface 32. This in turn forces waste material to swell upwardly into the recess 42.

In addition, the force applied by the secondary cutting edge 41 forces the downwardly directed edge 39 against the support surface 26 thereby ensuring a clean cut of the downwardly directed edge 39.

The cutting is finally completed once the punch blade progresses fully through the cross-section of the louvre 19, and at this point the arm 13 comes against a stop (not drawn) thereby bringing the arm 13 to rest. From this position, waste material or metal slugs will have dropped through the slot 24, and the arm 13 can be raised by the ram 16.

In a further aspect of this embodiment, there is provided means for fitting end caps to the formed louvre. This means for fitting the louvres may be used in association with the cut-off means 10.

In order to support the louvre as it is being formed in the roll forming machine and extending away from the forming rolls, an elongate horizontal bed 47 is used to support the louvre. Obviously, the cut-off means is positioned adjacent the end of the forming rolls, and the bed 47 in turn is positioned adjacent to the cut-off means 10.

In order to fit the end caps to the louvre 19, which are pressed onto the ends of the louvre 19, the bed may be provided with a first stop 45 and a second stop 46. Both the first and second stops 45 and 46 are used to assist in the fitting of the end caps to the louvre blade being formed.

Figure 6:
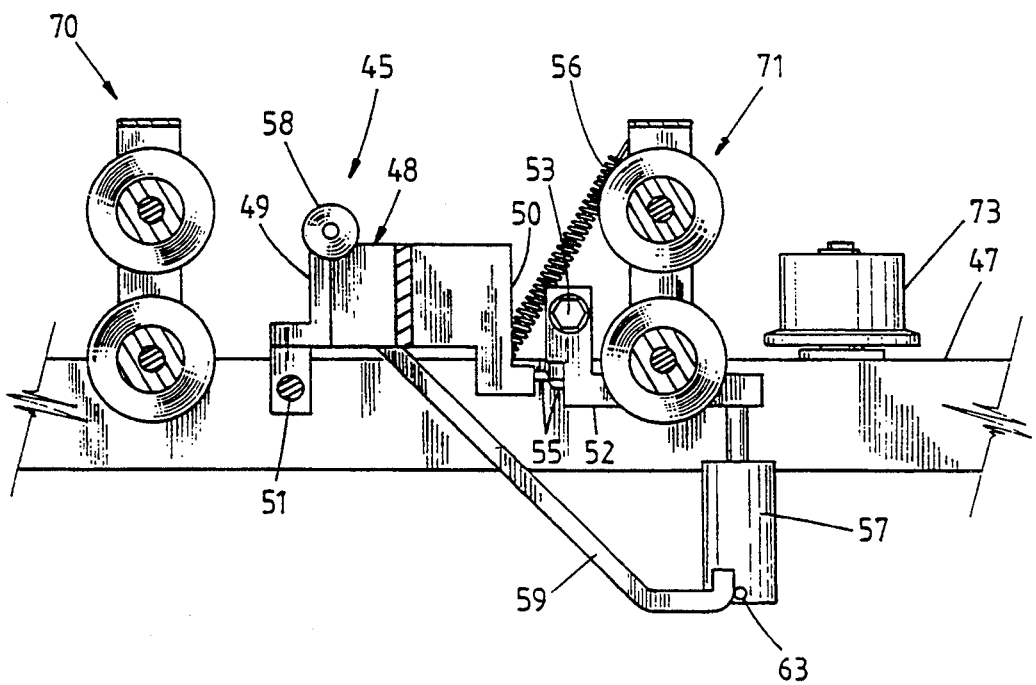
FIG. 6 shows a side view of the first stop.
Figure 7:
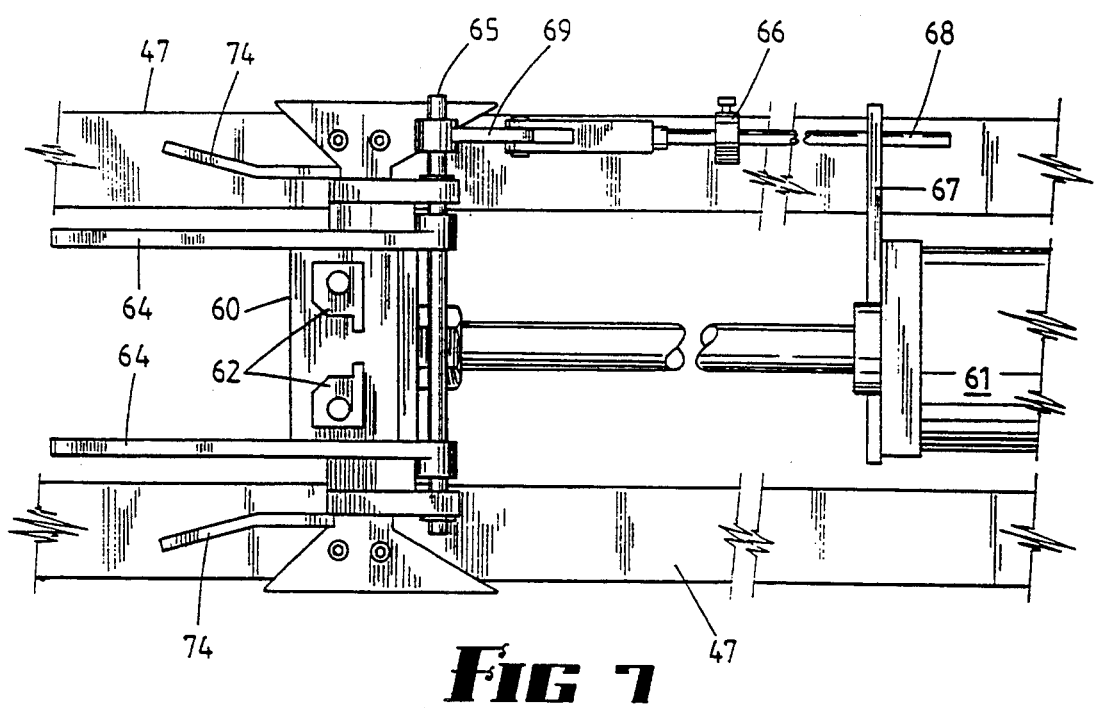
FIG. 7 shows a plan view of the second stop.

FIG. 6 shows a side view of the first stop 45. In general, the first stop 45 comprises an upstanding barrier 48 which has a first face 49 and a second face 50. FIG. 6, face 49 is provided with means for securing an end cap in position so that it is aligned with the louvre 19 as it is leaving the roll forming machine. Therefore, as the roll forming process continues, the louvre locates into the end cap when it reaches the first stop 45.

The first stop 45 is pivotally mounted to the bed 47 via pivot 51. A latch mechanism 52 is provided which initially holds the first stop 45 in the upright position as shown in FIG. 6, The latch mechanism 52 is pivotally attached to the bed via pivot 53. Nibs 55 are secured to both the first stop 45 and the latch mechanism 52. The nibs 55 are arranged as shown in FIG. 6 such that they overlap. A spring 56 is provided which provides sufficient force to raise the first stop member 45 to the upright position shown in FIG. 6.

In operation, when the end cap is positioned on the first face 49 and the louvre is commencing its engagement, as the louvre continues to engage, the force of engagement increases. Initially, the rotation of the first stop member 45 is resisted by the latch mechanism 52. The force being applied by the louvre is transferred from the first member 45 via the nibs 55 to the latch member 52. The weight of the arm 57 of the latch mechanism 52 resists the initial rotation of the first stop member 45, until the force is sufficient for the latch member 52 to be rotated thereby lifting the arm 57. This in turn causes the nibs 55 to move away from one another, which then results in a substantially instantaneous rotation of the first stop member into its retracted position. Therefore, the force at which the latch mechanism 52 disengages is dependent on the weight of the arm 57, and can be adjusted to the required force level which will initially allow insertion of the louvre into the end cap. Once this insertion has reached the required level, then the first stop member 45 will rotate and allow the louvre to pass over the top of the stop member 45. Rollers 58 are provided on the top of the barrier 48 which prevents damage or scoring being caused to the underneath surface of the louvre.

Once the louvre passer the first stop 45, as the roll forming machine continues to operate, the louvre being formed travels towards the second stop 46. The second stop 46 comprises a barrier member 60 which is located on the end of a pneumatic ram 61. The ram 61 is secured to brackets which are in turn slidably secured to the bed 47. The position of the second stop 46 is therefore adjustable depending on the length of the louvre being manufactured.

In the first phase of the operation, the ram 61 is extended as the louvre being formed is approaching the second stop 46. The barrier member 60 is provided with two pivotally mounted fingers 62 which are arranged to engage the spigot on the end cap. Spring returns are associated with the pivotal mounting of the fingers 62 such that as the spigot enters the barrier member 60, the fingers rotate to an open position, once the spigot is past the fingers 62, they spring back thereby holding the end cap captive in the barrier member 60.

As the louvre is being formed, a slight amount of longitudinal warping may occur, and in order to align the end of the louvre with the barrier mechanism 60, a pair of arms 64 extend in front of the barrier member 60. The arms 64 are above the barrier member 60 and ensure that the louvre is guided into the correct position. In addition, guides 74 ensure alignment of the louvre 19 in the horizontal plane.

A limit switch (not drawn) is associated with the second stop 46, and is activated upon the louvre engaging the barrier member 60. This terminates the roll forming process. At this stage, support members may engage the upper and lower surface of the louvre at a point adjacent the first stop member 45 so as to support the louvre during the cutting process. At this point, the cut-off means 10 is activated, and the louvre is severed. Once the louvre is severed, then the ram 61 retracts and pulls the cut end of the louvre past the first stop means 45.

As the cut end of the louvre passes clear of the barrier 48, the spring 56 pulls the barrier 48 into the upward position. As the barrier 48 rotates upwardly, arm 59 abuts against pin 63 in the arm 57. This causes latch mechanism 52 to rotate so as to allow the nibs 55 to pass one another. The nibs 55 then re-engage, in preparation for the next cycle of the operation.

Once the ram 61 fully retracts the louvre, the operation halts so that the remaining end cap my be placed onto the second face 50 of the barrier 48. At this stage, the first end cap for the next operation is placed on the first face 49. This helps in reducing the number of manual steps. Once the end cap is in place, the ram 61 reverses and forces the louvre into engagement with the end cap, and sufficient pressure is applied to fully engage both of the end caps. Again once this operation is complete, then the ram retracts allowing the louvre to be lifted from the bed. The arms 64 which assisted in the alignment of the louvre entering the barrier member 60 are pivotally mounted on a shaft 65 and rotate upwardly to allow removal of the louvre. This rotation is caused by a stop 66 coming against a stop plate 67 as the ram 61 retracts. A rod 68 which locates through an aperture in stop plate 67 causes a crank arm 69 to rotate which in turn rotates shaft 65 thereby raising arms 64.

At this point, the process is ready to recommence with the formation of the next louvre.

As mentioned previously, tubes are inserted longitudinally within the centre of the louvre to provide additional stiffness. Either steel or plastic tubes may be used. In the case of steel tubes, they are cut to the predetermined length which of course is dependent on the length of the louvre being formed. These tubes are introduced into the centre of the louvre as it is being formed, and in relation to the steel tubing, the roll forming process is stopped such that the end of the steel tube that is in the louvre that has been formed and is located over the bed 47, and the beginning of the tube that is in the louvre that is still being formed are either side of the cut-off die 11 such that there is a space between the steel tubes which enable the punch to pass between. This obviously prevents the punch 12 from impacting against the steel tubes.

In the case of plastic tubing, the punch 12 has sufficient force to sever the plastic tube. However, where round plastic tubing is being used, it is necessary to hold the plastic tubing within the centre of the louvre 19. It has been found that if the plastic tubing is not held, the action of the punch 12 will cause it to move from its centralised position, thereby buckling and deforming the upper and lower surfaces 31 and 34 of the louvre 19. In order to achieve this, two spacers may be inserted into the louvre from the roll forming machine end so as to locate either side of the plastic tube at a position which is adjacent to the cut-off means 10. The spacer members may be attached to elongate rods which in turn are secured to frame members which enable the spacer members to remain in position during the roll forming process. Preferably, the spacers are made from a plastic material which does not allow the glue used in the roll forming process to readily adhere to the spacers.

In order to prevent excessive movement of the louvre 19 during the cutting process, roller sets 70 and 71 are positioned either side of the first stop means 45. In addition to supporting the louvre 19 during the cut-off process, the roller set 70 which comprises upper and lower rollers 72 may also perform a sizing function as the louvre 19 advances towards the first stop 45. During the cut-off process, it is possible for minor deformations or expansions of the louvre 19 to be caused, and any such variation in size will provide some difficulty in the end of the louvre 19 correctly engaging with the end cap. Therefore, the rollers 72 will assist in correcting any minor irregularities thereby ensuring correct fitment of the end cap to the louvre 19.

The roller set 71 is used to guide the louvre while the ram 61 is forcing the second end of the louvre 19 into the end cap which is against the second face 50. Obviously, in order to remove the completed louvre from the bed 47, the roller set 70 is arranged to open at the required stage. As shown in FIG. 1, the roller set 70 is in the open position. Finally, guide rollers 73 provide some additional lateral support for the louvre as it is being roll formed, and in addition as the ram 61 is moving the louvre 19 with respect to the bed 47.

As will be seen from the above description, the improvements described are significant developments to the roll forming machine that was described in the earlier patent specification, and obviously make the manufacturing process quicker and less labour intensive.

I claim:

1. A cut-off means for severing an elongate hollow form member comprising:
    a die having a pair of spaced blades, said hollow form member being supported on the upper surface of said die, the upper surface of each said blade shaped so that they are contiguous with the lower surface of said hollow form member,
    a punch comprising a pointed substantially triangular-shaped blade having a pointed end, said punch being locatable between the pair of spaced blades of said die,
    movement control means for holding said punch above said die, controlling said punch such that it moves toward said die and controlling the descent of said punch such that the punch impacts the upper surface of said hollow form member at a first cutting point with sufficient force to pierce and cut the upper surface of said hollow form member, and to continue through said die thereby severing said hollow form member, and
    an end cap fitting means for fitting end caps to each end of said severed hollow form member.

2. A cut-off means according to claim 1 wherein said movement control means holds said punch above said die such that it can be released to fall towards said die under the action of gravity, said movement control means controlling the descent of said punch.

3. A cut-off means according to claim 2 wherein said punch falls through a vertical path.

4. A cut-off means according to claim 2 wherein said movement control means further comprises an arm having said punch secured at one end, the other end of said arm being pivotally secured such that said arm may rotate under the action of gravity.

5. A cut-off means according to claim 4 wherein said arm moves from a substantially vertical position to a substantially horizontal position.

6. A cut-off means according to claim 1 wherein the cut-off machine is used in conjunction with a roll forming machine so as to produce hollow form members of fixed lengths.

7. A cut-off means according to claim 1 wherein said end cap fitting means comprises an elongate bed extending away from said cut-off means, a first stop pivotally attached to said bed and arranged to locate a first end cap on one side thereof such that the end of the hollow form member locates within said first end cap, said first stop being arranged to pivot downwardly and below said hollow form member at a preset force being applied to said first stop, said preset force locating said first end cap on the end of said hollow form member, a second end stop slidably located on said elongate bed at a distance from said first stop, said second stop having means for holding said first end cap, and an actuator for moving said second stop with respect to said bed such that when said hollow form member is severed said second stop pulls said hollow form member over said first stop, said first stop being further arranged to pivot upwardly whereupon a second end cap is located on said first stop so that said actuator can push the end of said hollow form member into said second end cap.

8. A cut-off means for severing an elongate hollow form member comprising:
    a die having a pair of spaced blades, said hollow form member being supported on the upper surface of said die, the upper surface of each said blade shaped so that they are contiguous with the lower surface of said hollow form member,
    a punch comprising a pointed substantially triangular-shaped blade having a pointed end, said punch being locatable between the pair of spaced blades of said die,
    movement control means for holding said punch above said die, controlling said punch such that it moves toward said die and controlling the descent of said punch such that the punch impacts the upper surface of said hollow form member at a first cutting point with sufficient force to pierce and cut the upper surface of said hollow form member, and to continue through said die thereby severing said hollow form member, and said punch further comprising at lease one secondary cutting means spaced from said pointed end for first impacting against an outer edge of said hollow form member at a location spaced from said first cutting point to create a second cut that starts from said edge and progresses towards the first cut being created by said punch.

9. A cut-off means according to claim 8 wherein said secondary cutting means comprises a portion of said punch located towards a side of said punch and positioned to commence cutting before final severing by said punch.

* * * * *